W. C. STEVENS.
TIRE BEAD.
APPLICATION FILED MAR. 5, 1915.

1,231,446.

Patented June 26, 1917.

WITNESSES:
John W. Kittredge
A. L. Ely

INVENTOR.
William C. Stevens.
BY
ATTORNEY

UNITED STATES PATENT OFFICE.

WILLIAM C. STEVENS, OF AKRON, OHIO, ASSIGNOR TO THE FIRESTONE TIRE & RUBBER COMPANY, OF AKRON, OHIO, A CORPORATION OF OHIO.

TIRE-BEAD.

1,231,446. Specification of Letters Patent. Patented June 26, 1917.

Application filed March 5, 1915. Serial No. 12,310.

*To all whom it may concern:*

Be it known that I, WILLIAM C. STEVENS, a citizen of the United States, residing at Akron, in the county of Summit and State of Ohio, have invented certain new and useful Improvements in Tire-Beads, of which the following is a specification.

Prior to my invention it was the practice in the manufacture of beads for pneumatic tires to form a continuous strip of stock of the cross section of the bead, from which the workmen cut lengths to form overlapping ends on the bead. The ends of the length cut off were then cut in mortise joints and secured together. After being secured together, a piece of frictioned fabric was wrapped around the bead joint and the bead was finished, being passed on to the tire maker who applied the same to the tire. In the mortise joint formed by the workmen, no provision was made to prevent the separation of the ends of the bead in handling and they frequently did so separate and being covered over by the frictioned fabric mentioned, said separation was hard to detect and resulted in the loss of a great many of the beads.

I have sought to remedy the defect mentioned by making the bead ends, which are so joined in such fashion that they cannot separate after having been wrapped. The process of cutting and making the beads forms the subject matter of my co-pending application Serial No. 777,999, filed July 9, 1913.

The bead is illustrated in the accompanying drawings, in which like reference numerals refer to like parts and in which.

Figure 3:
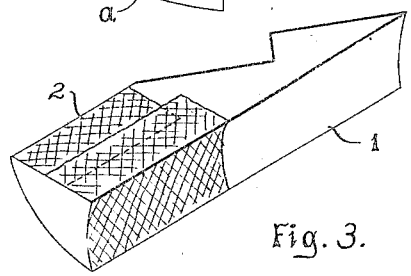
Fig. 3, is a perspective view of the joint with the ends separated.
Figure 2:
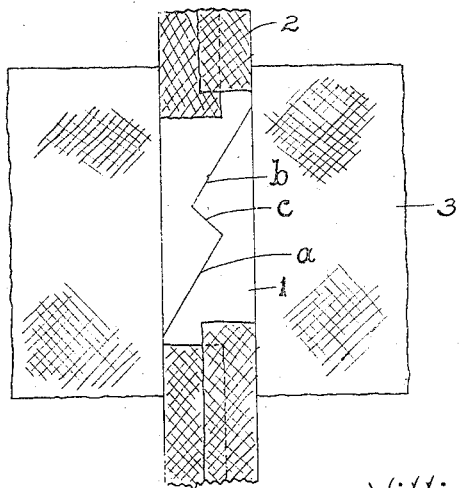
Fig. 2, is an enlarged view looking down upon the joint showing the strip of binding fabric in place before it is wrapped.

In the manufacture of my tire bead a continuous strip of material in the proper cross section (1) is formed, which is cut into exact length required for use by a tool, forming an irregular or jagged cut. The form of cut preferred by me is shown in Figs. 2 and 3 and is made by two oblique cuts ($a$) ($b$) which are parallel but not on the same plane. These cuts are placed beyond the longitudinal center of the bead and are joined by a third cut ($c$). The bead is then wrapped with a piece of frictioned fabric (2) which covers the entire bead except for the ends which are left uncovered.

The cuts at both ends of the bead are similar and when brought together form a mating interlocking joint. Before being brought together one side of the joint is covered with a strip of pure gum, the two ends having been placed together by the operator, and a strip of frictioned fabric in the form of a binding piece, (3) shown in Fig. 2, is placed around the joint to prevent lateral separation of the bead ends and after being wrapped is rolled down by the operator.

The joint is now complete and it will be seen that there can be no longitudinal separation of the ends of the bead.

Figure 1:
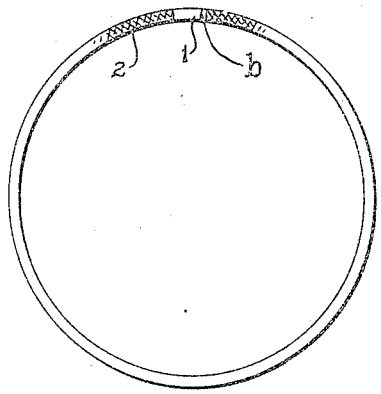
Figure 1, is an elevation of the tire bead with the binding strip removed.
Figure 4:
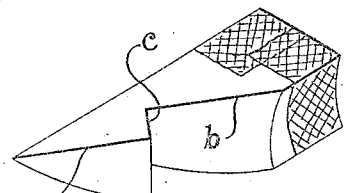
Fig. 4, is a modification.
Figure 4:
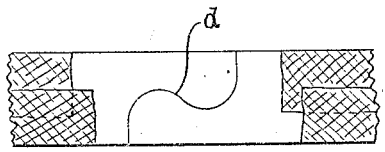

A modification of my bead is shown in Fig. 4, in which the cut ($d$) is made in a sinuous curve.

It is obvious that various other forms of interlocking joints might be made in the ends of the bead than those shown but I consider that any joint which forms an interlocking engagement in the ends of the tire bead comes within the scope of my invention, and I do not wish to be limited to the forms shown in the drawing.

What I claim is:

1. A tire bead for use in the edges of pneumatic tire casings comprising a strip of bead material having overlapping ends, one end of said bead being provided with a single projection and recess adapted to mate with a single projection and recess on the other end of said bead, the mating projections and recesses being adapted to bring said bead to a predetermined circumference, and means to prevent lateral separation of the bead ends.

2. A tire bead for use in the edges of pneumatic tire casings comprising a strip of bead material having overlapping ends, each end being cut on two diagonal planes and a cut transverse to said planes, the two ends being adapted to mate, whereby the bead, upon being circled, will be brought to a predetermined circumference, and a wrapping about said ends to prevent lateral separation thereof.

WILLIAM C. STEVENS.

Witnesses:
R. E. GLASS,
J. J. SHEA.